United States Patent [19]

Kajioka et al.

[11] Patent Number: 4,848,867
[45] Date of Patent: Jul. 18, 1989

[54] ROTARY JOINT FOR POLARIZATION PLANE MAINTAINING OPTICAL FIBERS

[75] Inventors: Hiroshi Kajioka; Toshio Fukahori, both of Hitachi; Noribumi Shiina, Ibaraki; Hitoshi Morinaga, Takahagi, all of Japan

[73] Assignee: Hitachi Cable Limited, Tokyo, Japan

[21] Appl. No.: 247,784

[22] Filed: Sep. 22, 1988

[30] Foreign Application Priority Data

Feb. 10, 1988 [JP] Japan ................... 63-27626

[51] Int. Cl.$^4$ .............................. G02B 6/38; H01J 5/16
[52] U.S. Cl. ............................. 350/96.21; 350/96.10; 350/96.16; 350/96.18; 350/96.20; 350/370; 250/227; 250/233
[58] Field of Search ............... 350/96.10, 96.15, 96.16, 350/96.18, 96.20, 96.21, 96.22, 370; 250/227, 233, 578

[56] References Cited

U.S. PATENT DOCUMENTS

| | | | |
|---|---|---|---|
| 4,027,945 | 6/1977 | Iverson | 350/96.22 X |
| 4,109,998 | 8/1978 | Iverson | 250/578 X |
| 4,179,189 | 12/1979 | Kaminow et al. | 350/96.30 |
| 4,303,300 | 12/1981 | Pressiat et al. | 350/96.20 |
| 4,367,040 | 1/1983 | Goto | 350/96.10 X |
| 4,398,791 | 8/1983 | Dorsey | 350/96.18 |
| 4,401,360 | 8/1983 | Streckmann et al. | 350/96.15 |
| 4,464,022 | 8/1984 | Emkey | 350/96.15 X |
| 4,472,052 | 9/1984 | Löfgren | 350/96.20 |
| 4,529,986 | 7/1985 | d'Auria et al. | 350/96.15 X |
| 4,584,470 | 4/1986 | Iizuka et al. | 350/96.30 |
| 4,641,915 | 2/1987 | Asakawa et al. | 350/96.18 |
| 4,720,162 | 1/1988 | Mochizuki et al. | 350/96.15 |
| 4,725,116 | 2/1988 | Spencer et al. | 350/96.20 |

OTHER PUBLICATIONS

Watanabe et al., "New 2-Channel Multiplexer Using Polarisation", Elect. Lett., 2/81, vol. 17, No. 3, pp. 133–135.

Primary Examiner—William L. Sikes
Assistant Examiner—Brian M. Healy
Attorney, Agent, or Firm—Dykema Gossett

[57] ABSTRACT

A rotary joint for polarization plane maintaining optical fibers which can couple two polarization plane maintaining optical fibers to each other while maintaining the polarization plane maintaining property. The rotary joint comprises a rotary member, a fixed member, two optical fiber collimators and a ½ wavelength plate for coupling a polarization plane maintaining optical fiber connected to the rotary member with another polarization plane maintaining optical fiber connected to the fixed member, and gears for rotating the ½ wavelength plate at a speed equal to one half the rotational speed of the polarization plane maintaining optical fiber on the rotary member side.

8 Claims, 2 Drawing Sheets

ROTARY JOINT FOR POLARIZATION PLANE MAINTAINING OPTICAL FIBERS

TECHNICAL FIELD

This invention relates to a novel rotary joint for polarization plane maintaining optical fibers for optically coupling polarization plane maintaining optical fibers for use in heterodyne optical communcations and optical fiber gyros while maintaining the polarization plane maintaining property.

BACKGROUND OF THE INVENTION

A known rotary joint for optical fibers is shown in FIG. 1 wherein a core, a clad and a support are disposed in a concentric structure. Referring to FIG. 1, a rotary member 1 is supported for rotation on a fixed member 2 by way of bearings. A focusing lens 5 is provided on the central axis of rotation of the rotary member 1, and a light sending side optical fiber 3 is connected to the focusing lens 5. Meanwhile, another focusing lens 6 is provided on the fixed member 2 in opposing relationship to the focusing lens 5 of the rotary member 1, and a light receiving side optical fiber 4 is connected to the focusing lens 6. With the rotary joint, the light sending side optical fiber 3 and the light receiving side optical fiber 4 are positioned relative to each other such that, when a light outgoing end of the former is rotated, the coupled amount of optical power to the latter is maximum and the changing amount of such optical power is minimum.

A rotary joint for coupling multi-core optical fibers is also known wherein a prism is provided between a plurality of rotary side optical fibers and stationary side optical fibers to be coupled such that the prism may be rotated at a rotational speed equal to one half the rotational speed of the rotary side optical fibers in the same direction (see for example, Japanece Utility Model Laid-Open No. 62-68106).

However, if such conventional rotary joints for single-core and multi-core optical fibers as described above were used for coupling of polarization plane maintaining optical fibers, the polarization plane maintaining property would be lost. This is because, while the natural polarization axis of the stationary side polarization plane maintaining optical fiber is fixed, the direction of linearly polarized light going out from the natural polarizaton axis of a rotary side polarization plane maintaining optical fiber varies with rotation of the rotary side polarization plane maintaining optical fiber.

SUMMARY OF THE INVENTION

It is an object of the present invention to provide a rotary joint for polarization plane maintaining optical fibers which eliminates the drawbacks of the prior art arrangements described above and can optically couple polarization plane maintaining optical fibers of a rotary system and a stationary system to each other while maintaining the polarization maintaining property.

A rotary joint for polarization plane maintaining optical fibers according to the present invention is constituted such that a polarization plane maintaining optical fiber of a rotary system and another polarization plane maintaining optical fiber of a stationary system are coupled to each other by way of a lens system which includes a ½ wavelength plate that is rotated at a rotational speed equal to half the speed of rotation of the polarization plane maintaining optical fiber of the rotary system in the same direction.

Referring to FIG. 2, if linearly polarized light which oscillates in the direction of $\phi$ with respect to the fast axis of a ½ wavelength plate comes into the ½ wavelength plate, then the slow axis component of linearly polarized light after passing through the ½ wavelength plate lags by $\pi$ and is thus inverted in phase. Consequently, linearly polarized light which oscillates in the direction of $-\phi$ with respect to the fast axis of the ½ wavelength plate goes out from the ½ wavelength plate.

Thus, if the natural polarization axes (fast axes, for example) of the polarization plane maintaining optical fibers on the rotary side and the stationary side are set coincident with the fast axis of the ½ wavelength plate upon initial aligning operation, then if the polarization plane maintaining optical fiber on the rotary side is rotated by $\theta$, the ½ wavelength plate is rotated by $\theta/2$. Consequently, the direction of linearly polarized light which comes into the ½ wavelength plate from the rotation side polarization plane maintaining optical fiber becomes $\theta/2$ with respect to the fast axis of the ½ wavelength plate as seen in FIG. 2, and the direction of transmitted light through the ½ wavelength plate coincides with the direction of $-\theta/2$ with respect to the fast axis of the ½ wavelength plate, that is, with the natural polarization axis of the polarization plane maintaining optical fiber on the stationary side. Accordingly, the polarization maintaining property is maintained in spite of rotation of the polarization plane maintaining optical fiber of the rotary side. Likewise, where linearly polarized light is to be transmitted from the polarization plane maintaining optical fiber on the stationary side to the polarization plane maintaining optical fiber on the rotary side, the polarization maintaining property is maintained.

According to one aspect of the present invention, there is provided a rotary joint for polarization plane maintaining optical fibers which comprises a hollow fixed member, an optical fiber collimator provided on a side wall of the hollow fixed member, a rotary member partially received in the hollow fixed member and rotatably provided in a coaxial relationship with the fixed member, another optical fiber collimator provided on the rotary member, a holder rotatably provided between the fixed member and the rotary member, a ½ wavelength plate mounted on the holder, a speed change gear mechanism provided between the rotary member and the holder so as to rotate the holder at an angular speed equal to one half the speed of rotation of the rotary member.

Each of the optical fiber collimators includes a collimate lens, a polarization plane maintaining optical fiber connected to the collimate lens, a holder with a convex spherical seat, and a ferrule.

Outgoing light from the polarization plane maintaining optical fiber on the fixed member side is expanded into a parallel beam by the collimate lens, passed through the ½ wavelength plate, introduced into and condensed by the collimate lens of the rotary side, and coupled to the polarization plane maintaining optical fiber of the rotary side.

The above and other objects, features and advantages of the present invention will be more fully understood from the following description taken in conjunction with the accompanying drawings and the appended claims.

DESCRIPTION OF THE PREFERRED EMBODIMENT

Figure 1:
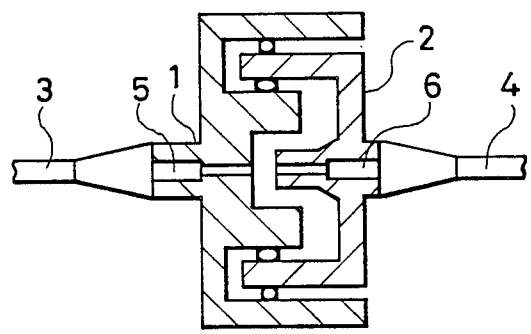
FIG. 1 is a sectional view showing a conventional optical rotary joint.
Figure 2:
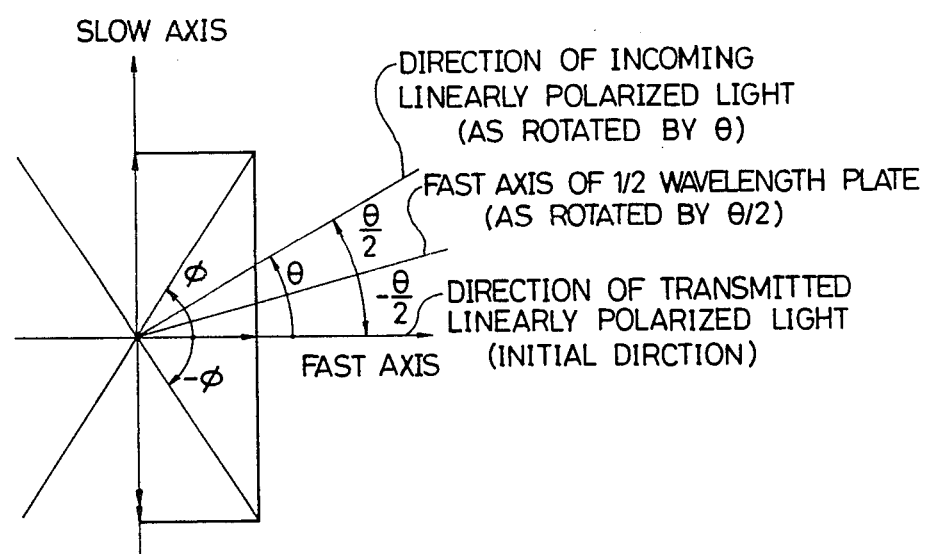
FIG. 2 is a diagram illustrating a polarization maintaining function of a rotary joint of the present invention.
Figure 3:
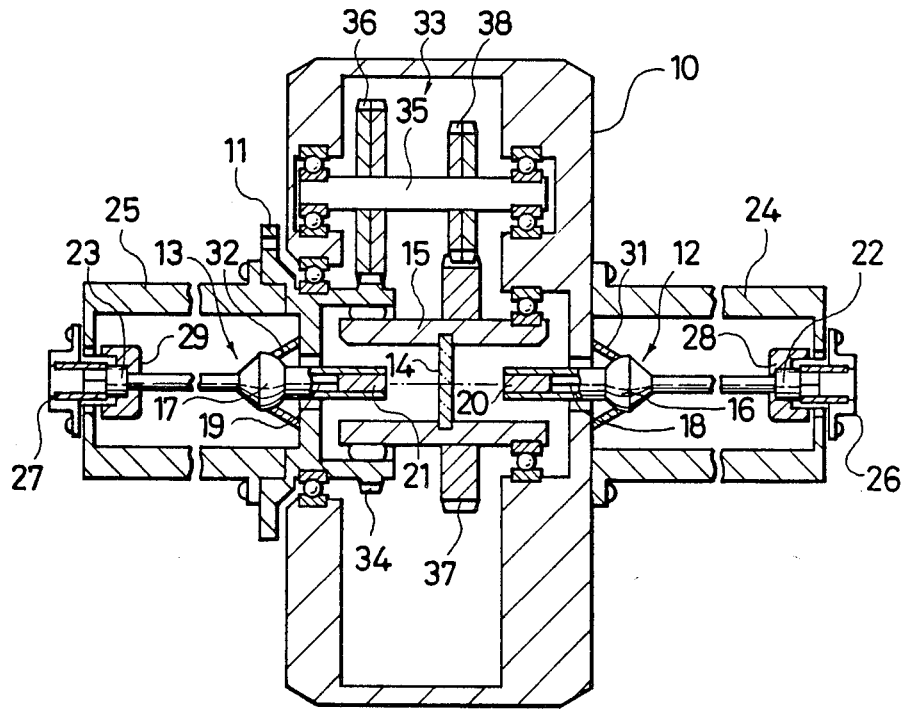
FIG. 3 is a sectional view of a rotary joint for polarization plane maintaining optical fibers showing a preferred embodiment of the present invention.

Referring to FIG. 3, there is shown a rotary joint for polarization plane maintaining optical fibers according to the present invention. The rotary joint shown includes a fixed member 10 installed on a stationary system and a rotary member 11 installed on a rotary system. The rotary member 11 is partially inserted in the fixed member 10 and mounted for rotation on the fixed member 10 by means of bearings. A fixed side optical fiber collimator 12 and a rotary side optical fiber collimator 13 are installed on an axis of rotation of the rotary member 11. A ½ wavelength plate holder 15 is rotatably supported on the fixed member 10 so as to be co-axial with the axis of rotation of the rotary member 11 with a ½ wavelength plate 14 being supported by the holder 15.

The fixed side optical fiber collimator 12 is a collimator of the pigtail type including a holder 16 with a convex spherical seat, a collimate lens 20 provided at a left end of the holder 16 so as to face a polarization plane maintaining optical fiber 18, and a ferrule 22 provided at a right end of the polarization plane maintaining optical fiber 18. The ferrule 22 is mounted by means of a fastening screw 28 to a receptacle 26 installed on a receptacle holding member 24 which in turn is removably mounted on the fixed member 10.

Meanwhile, the rotary side optical fiber collimator 13 includes, similarly to the fixed side optical fiber collimator 12, a holder 17 with a convex spherical seat, a polarization plane maintaining optical fiber 19, a collimate lens 21, and a ferrule 23. The ferrule 23 is mounted by means of a fastening screw 29 to a receptacle 27 installed on a receptacle holding member 25 which in turn is removably mounted on the rotary member 11.

Alignment of the angles and axes of the fixed and rotary side optical fiber collimators 12 and 13 is attained in the following manner. The collimate lenses 20 and 21 and the polarization plane maintaining optical fibers 18 and 19 are disposed in and aligned with the holders 16 and 17 of the fixed and rotary side optical fiber collimators 12 and 13, respectively beforehand.

At first, the holder 17 of the rotary side optical fiber collimator 13 is pressed at a convex spherical seat against the rotary body 11 with a conical ring 32 interposed therebetween while the rotary member 11 is being rotated to attain alignment of the collimator 13 and the rotary member 11. After such an alignment is reached, mutually contacting portions of the convex spherical face of the holder 17 and the conical ring 32 and mutually contacting portions of the conical ring 32 and the rotary member 11 are welded to each other by, for example, irradiation of a YAG laser beam upon them. It is to be noted that they may otherwise be fixed by soldering or the like.

Subsequently, the fixed side optical fiber collimator 12 is aligned at the holder 16 with an incoming beam with use of a convex spherical seat and the conical ring 31, and then contacting faces of the holder 16 and the conical ring 31 and contacting face of the conical ring 31 and the fixed member 10 are welded to each other by means of a YAG laser beam.

Since the diameter of light beams of the polarization plane maintaining optical fibers 18 and 19 having a small core diameter are expanded through the collimate lenses 20 and 21, respectively, the displacement of the optical axes of the optical fibers 18 and 19 from each other is moderated significantly. Further, the angular displacement can be adjusted with a high degree of accuracy by rotating the spherical seats of the holders 16 and 17 relative to the conical rings 31 and 32, respectively.

In the meantime, a speed reduction gear mechanism 33 for transmitting rotation of the rotary member 11 at a ½ reduced angular speed in the same direction to the ½ wavelength plate holder 15 is provided around the ½ wavelength plate holder 15 in the fixed member 10. The speed reduction gear mechanism 33 includes a first gear 34 mounted on an outer periphery of the rotary member 11, a second gear 36 mounted on a shaft 35 supported on the fixed member 10 so as to engage with the first gear 34, a third gear 37 mounted on an outer periphery of the ½ wavelength plate holder 15, and a fourth gear 38 provided on the shaft 35 so as to engage with the third gear 37. The second and fourth gears 36 and 38 are each divided into two parts so that there may be a rotational displacement between the two parts in the direction of rotation thereof relative to each other, and a spring (not shown) is provided between the divided gear parts of each of the second and fourth gears 36 and 38 so as to exert a force to cause a rotational displacement relative to each other, which eliminates an influence of a backlash between the first and second gears, and between the third and fourth gears.

With the rotary joint for polarization plane maintaining optical fibers having the construction described above, if light is sent out from the rotary side polarized plane maintaining optical fiber 19, the light thus sent out is converted into an expanded parallel light by the collimate lens 21, transmitted through the ½ wavelength plate 14, introduced into and condensed by the fixed side collimate lens 20, and coupled to the polarization plane maintaining optical fiber 18. At the initial setting, the natural polarization axes (fast axes, for example) of the polarization plane maintaining optical fibers 18 and 19 are made coincident with the fast axis of the ½ wavelength plate 14.

With the arrangement, as the rotary member 11 rotates, the direction of the linearly polarized light going out from the polarization plane maintaining optical fiber 19 also rotates. At the same time, since the ½ wavelength plate 14 is rotated at a speed of rotation just equal to one half the speed of rotation of the rotary member 11 together with the ½ wavelength plate holder 15, the direction of the linearly polarized light which passes through the ½ wavelength plate 14 is maintained in a fixed stationary condition, i.e., it coincides with the natural polarization axis of the polarization plane maintaining optical fiber 18 when the linearly polarized light is coupled to the polarization plane maintaining optical fiber 18. On the contrary, when linearly polarized light is sent out from the fixed side polarization plane maintaining optical fiber 18, the direction of the linearly polarized light after passing through the ½ wavelength plate 14 is rotated, as the ½ wavelength plate 14 is rotated at an angular speed equal to twice the speed of rotation of the ½ wavelength plate 14 in the same direction. Accordingly, the linearly polarized light is coupled in a coincident relationship with the natural polarization axis of the polarization plane maintaining optical fiber 19.

The present invention exhibits the following effects:

(1) Since transmission of linearly polarized light between a rotatable polarization plane maintaining optical fiber and a stationary polarization plane maintaining optical fiber can be performed stably on a real time basis, application of the present invention extends to installations of polarization plane maintaining optical fibers for coherent communications and to optical measurements. In the measurements, signal processing outside the rotary section (i.e., on the stationary side) is enabled.

(2) If a rotary joint of the present invention is applied to a drawing process of a polarization plane maintaining optical fiber, the extinction ratio of the polarization plane maintaining optical fiber can be measured on a real time basis.

(3) Where a polarization plane maintaining optical fiber is formed into a coil for use with an optical fiber gyro or a hydrophone, if a rotary joint of the present invention is applied to a coiling device, deterioration of the extinction ratio can be measured on a real time basis.

What is claimed is:

1. A rotary joint for polarization plane maintaining optical fibers, comprising:
   a rotary system;
   a stationary system;
   a lens system for coupling a first polarization plane maintaining optical fiber connected to said rotary system with a second polarization plane maintaining optical fiber connected to said stationary system; and
   a ½ wavelength plate provided on said lens system so as to be rotated in the same direction at a speed of rotation equal to one half the speed of rotation of said polarization plane maintaining optical fiber connected to said rotary plate.

2. A rotary joint for polarization plane maintaining optical fibers according to claim 1, wherein said rotary system includes a rotary member on the axis of rotation of said rotary system, a first collimate means mounted on said rotary member and extending in the direction of the axis of rotation of said rotary member, a first receptacle connected to a first end of said first collimate means, and a first receptacle holding member removably mounted on said rotary member so as to mount said first receptacle on said rotary member, and
   said fixed system includes a fixed member for supporting said rotary member for rotation thereon, said collimate means securely mounted on said fixed member and extending in coaxial relationship with said first collimate means, a second receptacle connected to a second end of said second collimate means, and a second receptacle holding member removably mounted on said fixed member so as to mount said second receptacle on said fixed member.

3. A rotary joint for polarization plane maintaining optical fibers according to claim 2, wherein said first collimate means includes a first ferrule positioned at said first end, a first collimate lens provided at the other end of said first collimate means, a first polarization plane maintaining optical fiber interposed between said first collimate lens and said first ferrule and held in alignment with said first collimate lens, and a first holder with a convex spherical seat securely mounted in prealigned relationship on said rotary member and having said first collimate lens and said first polarization plane maintaining optical fiber therein, and
   said second collimate means includes a second ferrule located at said second end, a second collimate lens provided at the other end of said second collimate means, a second polarization plane maintaining optical fiber interposed between said second collimate lens and said second ferrule and held in alignment with said second collimate lens, and a second holder with a convex spherical seat securely mounted in prealigned relationship on said fixed member and having said second collimate lens and said second polarization plane maintaining optical fiber therein.

4. A rotary joint for polarization plane maintaining optical fibers according to claim 3, further comprising conical rings for mounting said holders with a convex spherical seat on said rotary member and said fixed member.

5. A rotary joint for polarization plane maintaining optical fibers according to claim 1, wherein said ½ wavelength plate is supported on a ½ wavelength plate holder which is supported for rotation around the axis of rotation of said rotary system.

6. A rotary joint for polarization plane maintaining optical fibers according to claim 1, further including a speed change gear mechanism for transmitting rotation of said rotary system at a ½ reduced angular speed to said ½ wavelength plate holder.

7. A rotary joint for polarization plane maintaining optical fibers according to claim 6, wherein said speed change gear mechanism includes a plurality of gears at least one of which is divided into two parts such that a relative displacement in the direction of rotation thereof may be caused between the two parts, and a resilient means is provided between the two divided parts for causing a rotational displacement between the two divided parts.

8. A rotary joint for polarization plane maintaining optical fibers according to claim 1, wherein one of said rotary system, fixed system and ½ wavelength plate is rotatable relative to the other two.

* * * * *